INVENTOR.
HOWARD L. DANIELS
BY
Merchant & Gould
ATTORNEYS

United States Patent Office 3,512,071
Patented May 12, 1970

3,512,071
APPARATUS FOR IMPROVING LOW TEMPERA-
TURE BATTERY PERFORMANCE
Howard L. Daniels, West St. Paul, Minn., assignor to
International Electric Co., Chicago, Ill., a corporation
of Illinois
Filed Nov. 1, 1967, Ser. No. 679,767
Int. Cl. H02j 7/00
U.S. Cl. 320—5                                              5 Claims

ABSTRACT OF THE DISCLOSURE

The apparatus includes a center tapped inductance with the center tap adapted to be attached to the negative terminal of a storage battery, one end of said inductance connected through a semi-conductor diode to a second terminal adapted to be attached to the positive terminal of the battery, and the other end of the coil connected through a transistor to the second terminal in a manner to cause the transistor to conduct periodically when the apparatus is attached to a battery. The apparatus drains a small current from the battery and forces a sufficient current back through the battery to raise the temperature thereof during periods when the external temperature is subnormal.

BACKGROUND OF THE INVENTION

Field of the invention

In general, lead-acid storage batteries are utilized for starting internal combustion engines in automobiles, trucks, tractors, etc. In cold climates, as the temperature drops, starting these engines becomes increasingly difficult because the internal voltage of the lead-acid storage battery drops and the effective internal resistance rises, thereby rendering the battery less capable of supplying energy to a cranking motor. Typically, at temperatures lower than −20° F., the battery becomes incapable of supplying sufficient energy to crank the engine at sufficient speed to start it. In general, the activity of the battery can be maintained by providing a flow of current through the internal resistance of the battery resulting in generation of thermal energy within the battery which elevates its internal temperature above the ambient temperature with resulting improvement in its ability to supply energy.

Description of the prior art

Various devices which operate from AC power lines have been employed to maintain the activity of batteries during periods of standing in subzero temperatures. One such device which has been wisely used is to provide a relatively low charging current to the battery through suitable voltage reducing and rectifying circuitry. Another such device is to supply a continuous AC current to the battery terminals from external power lines through a capacitor which blocks discharge of the battery. However, the utility of such devices is limited to the fact that AC power sources are often not readily available.

Attempts have been made to maintain activity simply by connecting a resistance load across the battery, but this approach tends to be self-defeating. A sufficient current to produce the desired internal heating rapidly depletes the battery and more energy is wasted externally than is developed in the battery.

SUMMARY OF THE INVENTION

The present invention pertains to apparatus for improving low temperature battery performance comprising first and second terminals adapted to be connected to the negative and positive terminals of a battery, respectively, electrical energy storage means, periodic switching means connected to said storage means for operation when the energy in said storage means reaches a predetermined value, and means connecting said storage means and said switching means to said first and second terminals for periodically allowing current to flow from a battery connected to said terminals into said storage means, and, upon the operation of said switching means, allowing current to flow from said storage means into said battery to maintain activity therein.

It is an object of the present invention to provide apparatus for improving low-temperature battery performance.

It is a further object of the present invention to provide apparatus for improving low-temperature battery performance which utilizes a small amount of energy from the battery, These and other objects of this invention will become apparent to those skilled in the art upon consideration of the accompanying specification, claims, and drawings.

BRIEF DESCRIPTION OF THE DRAWINGS

Referring to the drawings.

DESCRIPTION OF THE PREFERRED EMBODIMENT

Figure 1:
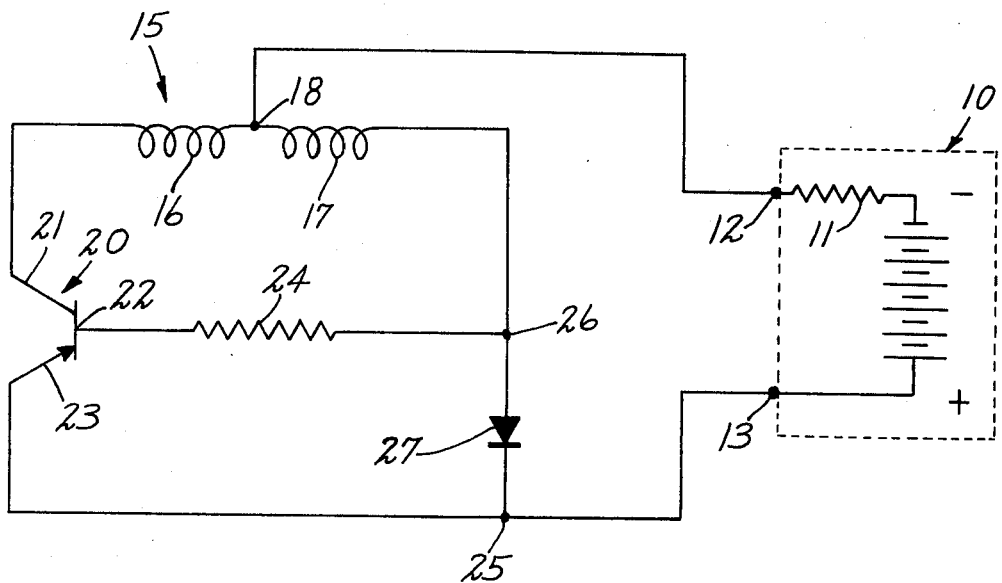
FIG. 1 is a schematic diagram of the present apparatus attached to a battery.

In FIG. 1, the numeral 10 generally designates a lead-acid storage battery having an internal resistance 11. A first terminal 12 is attached to the negative terminal of the storage battery 10 and a second terminal 13 is connected to the positive terminal of the storage battery 10. The terminal 12 is connected to an electrical energy storage device, which in this embodiment is an inductor, generally designated 15. The inductor 15 includes a pair of similar coils 16 and 17, each having one end connected to a junction point 18. The coils 16 and 17 are inductively coupled and the junction point 18 may simply be a tap on the inductor 15. The junction point 18 is connected directly to the terminal 12.

A P-N-P transistor, generally designated 20, has a collector 21 connected to the free end of the coil 16, a base 22 connected to one end of a resistor 24, and an emitter 23 connected to a junction point 25. The opposite end of the resistor 24 is connected to a junction point 26, which is also connected to the free end of the coil 17 and to the anode of a semi-conductor diode 27. The cathode of the diode 27 is connected to the junction point 25, which is also connected to the terminal 13. It should be understood that the transistor 20 and resistor 24 operate as a switch to allow periodic current flow through the coil 16, and the diode 27 is a unidirectional current limiting device to allow current to flow only from the junction point 26 to the junction point 25. Many switching devices and unidirectional current limiting devices may be substituted by those skilled in the art for the components specified herein.

The operation of the circuit described is as follows. When the circuit to the storage battery 10 is initially completed, a small current flows from the terminal 13 to the emitter 23 of the transistor 20. From the emitter 23, the current flows to the base 22, resistor 24, coil 17 and back to the terminal 12. This base current biases the transistor 20 in a conducting state and causes a larger current to flow from the terminal 13 to the emitter 23, through the transistor 20 to the collector 21, through the coil 16 and back to the terminal 12. The coils 16 and 17 are inductively coupled so that the current through the coil 16 causes the end of the coil 17 connected to terminal 26 to become more negative, which biases the base 22 more negative and causes the transistor 20 to conduct harder. This regenerative action quickly drives the transistor 20 into saturation, thereby, applying substantially the entire voltage of the storage battery 10 across the coil 16. Also, because the junction point 26 is negative with respect to the junction point 25, the diode 27 is biased to a non-conducting state.

Figure 2:
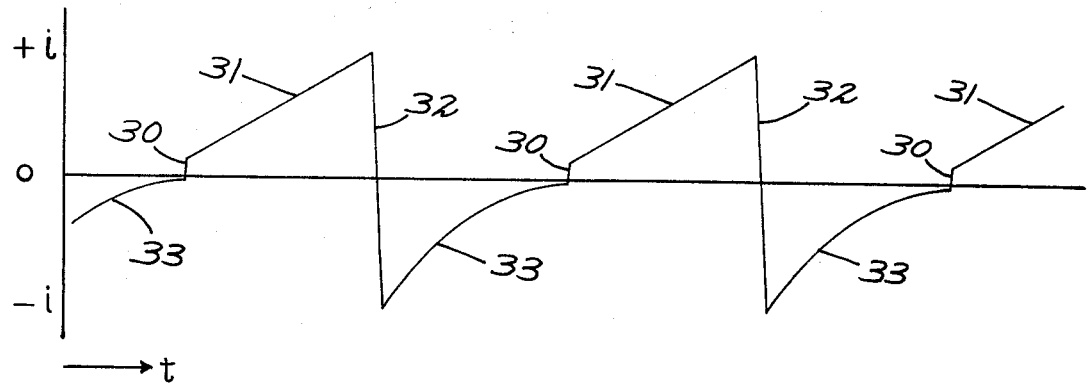
FIG. 2 is a diagram approximating the current wave form at the terminals of the battery.

Referring to FIG. 2, the short, substantially vertical portion of the wave form above the reference line, indicated by the numeral 30, illustrates the initial turning on of the transistor 20. The linearly increasing portion of the wave form, designated 31, indicates the increase of current through the coil 16. The current increase is substantially linear because sufficient time has not passed for a significant voltage drop to develop across the internal resistance 11 of the storage battery 10.

As the transistor 20 approaches saturation, the current through coil 16 begins to stabilize and, because the current through coil 16 is changing at a less rapid rate, the junction point 26, and, consequently, the base 22 become less negative, tending to reduce the current through transistor 20. Reduction of current through the coil 16 quickly induces a current in coil 17 traveling from junction point 18 toward junction point 26. A reverse regenerative action occurs which quickly drives the transistor 20 into cut-off or a non-conducting state, as illustrated in FIG. 2 by the substantially vertical line, designated 32, passing through the zero reference line and down to negative *i*.

When the transistor 20 is cut off, the flux field produced in the coil 16 continues to collapse and induce a current into the coil 17, which current gradually diminishes toward 0, as illustrated by the exponential curve 33. The current induced in coil 17 biases the diode 27 into the conducting state so that a current path is completed through the diode 27, the battery 10, the internal resistance 11 and back to the junction point 18 at the coil 17. When this current flow diminishes sufficiently, the battery 10 again causes a current flow from the emitter 23 to the base 22 of the transistor 20, and a second cycle of operation is begun.

Parameters for the above-described circuit, which have been found suitable for maintaining activity of an automotive type storage battery, are as follows:

Transistor 20—2N176 (germanium P-N-P)
Diode 27—1N2094 (silicon low current)
Resistor 24—2000 ohms, ½ watt
Inductor 15—
    Coil 16:
        Inductance 18 millihenrys
        Resistance 0.4 ohms
    Coil 17:
        Inductance 18 millihenrys
        Resistance 0.4 ohms This circuit yields a peak AC current of about one ampere at a frequency of 300 cycles per second with a DC drain of about 0.1 ampere.

Thus, apparatus is described which provides means for increasing the internal temperature of a battery by deriving a current flow from the battery resulting in minimal depletion of the stored charge. Further, this apparatus is extremely simple and inexpensive to construct and operate.

What is claimed is:
1. Apparatus for improving low-temperature battery performance comprising:
    (a) first and second terminals adapted to be connected to the negative and positive terminals of a battery, respectively;
    (b) first and second winding means inductively coupled together for inducing a current into said second winding means upon the application of a current to said first winding means;
    (c) said first terminal being connected to one end of each of said first and second winding means;
    (d) unidirectional current limiting means connecting the other end of said second winding means to said second terminal for allowing current to flow through said second winding means from said first terminal to said second terminal and preventing the flow of current through said second winding means from said second terminal to said first terminal; and
    (e) periodic switching means connecting the other end of said first winding means to said second terminal for allowing current to flow periodically from said second terminal through said first winding means to said first terminal.

2. Apparatus for improving low-temperature battery performance as set forth in claim 1 wherein the unidirectional current limiting means includes a semi-conductor diode.

3. Apparatus for improving low-temperature battery performance as set forth in claim 1 wherein the periodic switching means includes a semi-conductor device.

4. Apparatus for improving low-temperature battery performance as set forth in claim 3 wherein the semi-conductor device includes a transistor.

5. Apparatus for improving low-temperature battery performance as set forth in claim 1 wherein the closed period of the switching means is sufficiently small to produce a substantially linear rise of current through the first winding means.

References Cited

UNITED STATES PATENTS

| | | | |
|---|---|---|---|
| 2,710,937 | 6/1955 | Godshalk et al. | 320—35 X |
| 2,920,259 | 1/1960 | Light | 321—2 |
| 3,161,836 | 12/1964 | Miller | 331—112 |
| 3,233,362 | 2/1966 | Chapman | 331—112 X |
| 3,383,624 | 5/1968 | Fiala | 331—111 X |

J D MILLER, Primary Examiner

J. M. GUNTHER, Assistant Examiner

U.S. Cl. X.R.

320—10, 14; 331—111, 112